G. D. JEWETT.
BALING-ROPE.
No. 178,156.  Patented May 30, 1876.
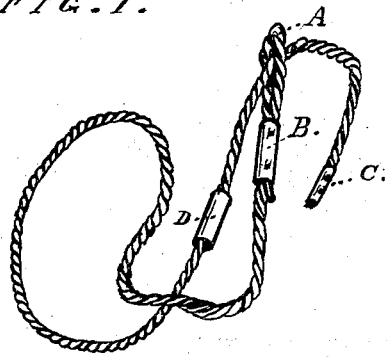
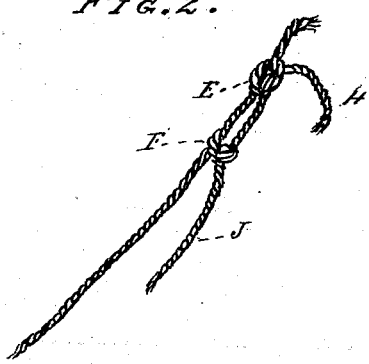
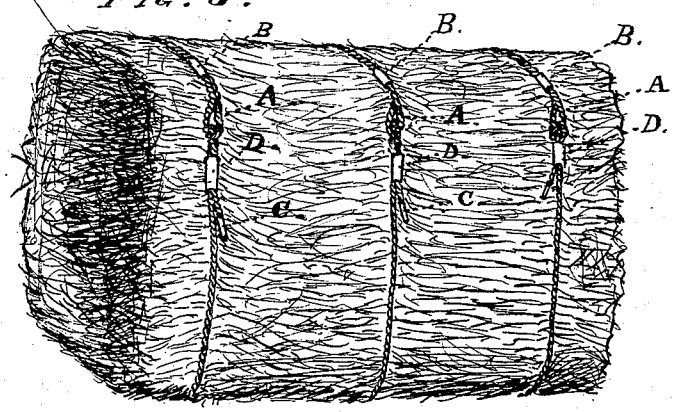

UNITED STATES PATENT OFFICE.

GEORGE D. JEWETT, OF OAKLAND, CALIFORNIA.

IMPROVEMENT IN BALING-ROPES.

Specification forming part of Letters Patent No. 178,156, dated May 30, 1876; application filed November 27, 1875.

*To all whom it may concern:*

Be it known that I, GEORGE D. JEWETT, of Oakland, in the county of Alameda and State of California, have invented certain new and useful Improvements in the Construction and Arrangement of Baling-Ropes, of which the following is a specification:

The object of my invention is to secure a more convenient and rapid mode of tying up bales of hay, straw, &c., and to save the ropes once used, and preserve them in good condition for future use.

My invention will be more fully understood by reference to the accompanying drawing.

Figure 1 is a perspective view of my improved baling-rope. Fig. 2 is a section of the ordinary baling-rope, such as is commonly used for baling hay and straw. Fig. 3 shows a bale of hay with my improved baling-ropes for binding the same.

A represents the loop; B, the clutch-wrapper; C, the point-binder or tug; D, the slip-band; E and F, knots; and H and J, ends of bale-rope, secured in the usual way by tying in double knots.

The following is the operation of the same. The bale being pressed in the usual manner, the improved rope is attached, and the bale secured by passing the end of the same, to which the point-band C is attached, twice through the loop A, when it is doubled back and drawn through the slip-band D, which is then drawn close up to the loop, thus firmly securing the same. When the bale is opened the slip-band is moved back, and the end c thrown up and the band readily loosened and taken off, thus saving the band without cutting.

The advantages and necessity of my improvement are seen in the fact that thousands of dollars are wasted by throwing away the baling-ropes rendered useless by cutting, it being impracticable to untie the baling-rope tied in the usual way. The saving in the length of rope required is from six to eight feet in the bale of six ropes, and from three to four feet in the bale of three ropes to each bale, which will in a great measure compensate for the extra expense of preparing the extra fittings in my improvement.

My invention consists in providing the loop A to form the tie by tucking the end C twice through the same, and doubling back and securing by the slip-band D, and tucking the same under the bale-rope, so as to be readily loosened and taken off without injury; therefore,

What I claim, and desire to secure by Letters Patent, as a new article of manufacture, is—

The bale-band having the loop A, the slip-band D, and the point-band C, or their equivalents, when constructed and arranged substantially in the manner and for the purposes set forth.

GEO. D. JEWETT.

Witnesses:
JOHN. H. REDSTONE,
A. E. REDSTONE.